Patented Oct. 12, 1954

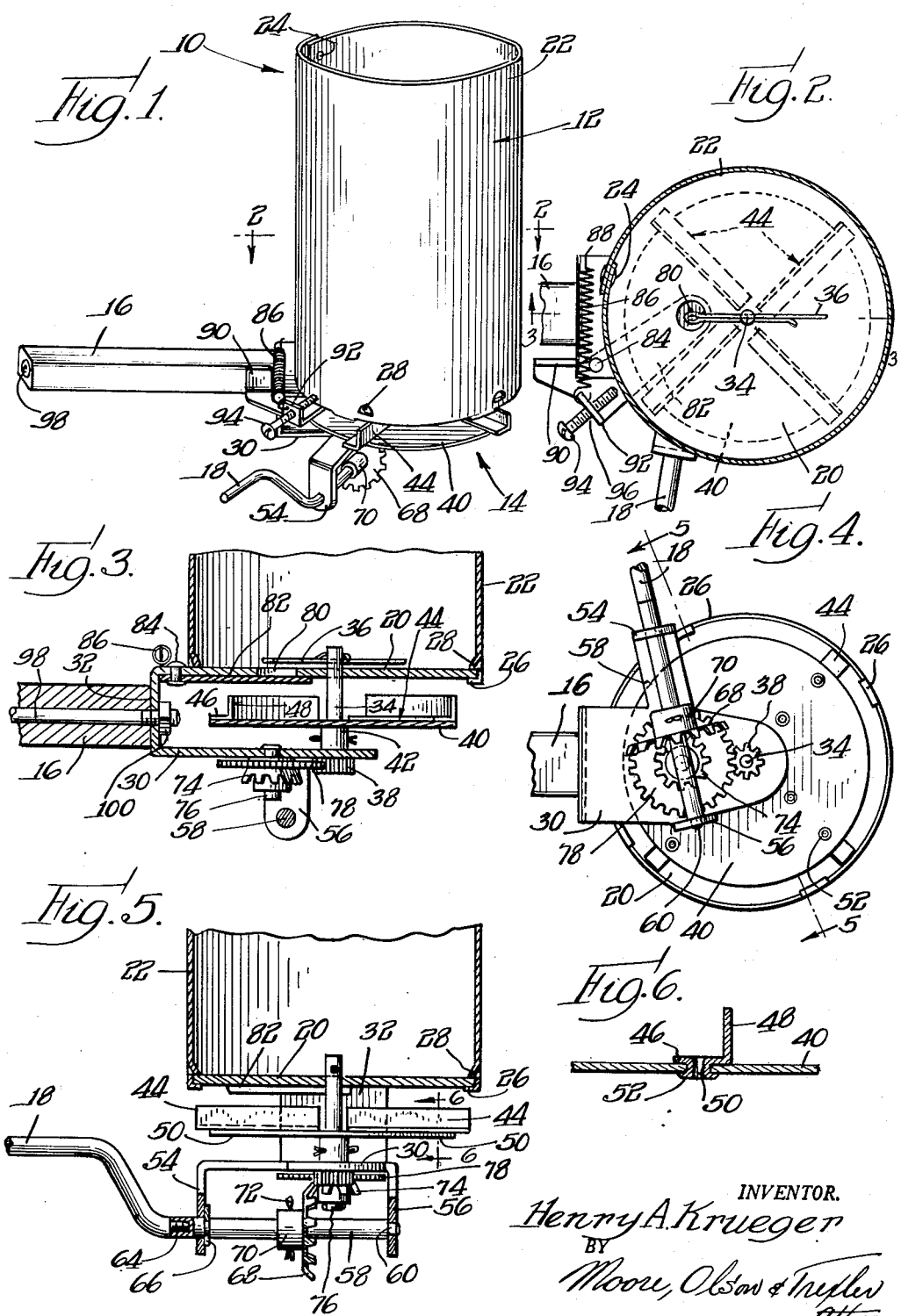

2,691,530

UNITED STATES PATENT OFFICE 2,691,530

SEEDING DEVICE

Henry A. Krueger, Morocco, Ind., assignor to R. Krasberg & Sons Mfg. Co., Chicago, Ill., a corporation of Illinois Application June 6, 1950, Serial No. 166,435

2 Claims. (Cl. 275—12)

This invention relates to seeders and more particularly to hand operated seeders for applying seed to small areas such as lawns and the like.

To produce a satisfactory growth of vegetation such as grass, it is necessary that the seeds be uniformly spread throughout the area to be seeded, and it also is necessary to apply the proper weight or number of seeds per unit area. It is particularly difficult to obtain uniform distribution of the seeds near the edges of the area being sown unless means is provided for stopping the flow of seed to the distributing mechanism. The volume of seed to be applied is dependent upon the type of seed being used, and therefore it is necessary to provide means for varying the volume of seed applied per unit area. The total volume of seed to be applied when seeding areas such as lawns and the like, is generally very small and accordingly it is advantageous to use manually operated seeders which can be readily operated by one person. In some cases it will not only be desirable but necessary to use hand operated seeders, since the area will be of a size which prohibits the use of more highly mechanized machines.

Accordingly it is an important object of the present invention to provide an improved seeder and, more particularly, an improved manually operated seeder for use on small areas such as lawns and the like.

Another object of the invention is to provide in a seeder of the type set forth, improved means for controlling the volume of seed being fed to the distributing mechanism.

Yet another object of the invention is to provide in a seeder of the type described, means for quickly and effectively stopping the flow of seed to the distributing mechanism whenever the operator so desires.

Still another object of the invention is to provide a seeder of the type described which is simple and economical in manufacture and which is capable of being easily and effectively used by persons who are not skilled in the agricultural arts.

These and other objects and advantages of the invention will be better understood from the following description when taken with the accompanying drawing. In the drawing wherein like reference numerals have been used to designate like parts throughout:

Figure 1 is a perspective view of a seeder made in accordance with and embodying the principles of the present invention;

Figure 2 is a view in cross section of the seeder shown in Figure 1 substantially as seen in the directions of the arrows along the line 2—2 of Figure 1, a portion of the handle being broken away;

Figure 3 is a partial view in vertical section of the seeder shown in Figures 1 and 2 substantially as seen in the direction of the arrows along the line 3—3 of Figure 2;

Figure 4 is a plan view of the bottom of the seeder shown in Figure 1 with a portion of the handle broken away;

Figure 5 is a partial view in vertical section of the seeder shown in Figures 1-4 substantially as seen in the directions of the arrows along the line 5—5 of Figure 4; and Figure 6 is a partial cross sectional view in detail showing the manner in which the vanes of the distributing mechanism are attached to their support plate.

Referring now to the drawing and particularly to Figure 1 thereof, there is shown a seeder, generally designated by the numeral 10, made in accordance with and embodying the principles of the present invention. The seeder 10 comprises generally a seed container 12, a distributing mechanism 14 mounted below and carried by seed container 12, a handle 16 which is attached to and supports the seed container 12 and the distributing mechanism 14, and a crank 18 which operates the distributing mechanism 14.

Container 12 is generally cylindrical in shape and has a circular base or bottom 20 to which is attached an upstanding peripheral wall 22. Wall 22 may be formed by folding a rectangular sheet of material into cylindrical form and fastening the overlapping edges together in any suitable manner such as by the rivets 24. An inwardly extending flange 26 is formed at one end of the upstanding wall 22 and is adapted to receive the bottom 20. Struck out portions 28 formed from the body of wall 22 engage the side of bottom 20 disposed opposite the side of flange 26 thereby to attach bottom 20 to wall 22.

The distributing mechanism 14 is mounted on the bottom 20 of the container 12 and a frame 30 which is integrally joined to bottom 20 of container 12 by means of a bight portion 32. A shaft 34 is rotatably mounted in apertures formed in bottom 20 and frame 30. The upper end of shaft 34 is retained in position by means of a cotter pin 36 which extends through a hole in the shaft and the lower end of shaft 34 is attached to a gear 38 positioned below frame 30. The cotter pin 36 and the gear 38 serve to retain shaft 34 in position.

Mounted on shaft 34 and fixedly attached thereto is a support plate 40 which is circular in shape and which has a diameter slightly less than the diameter of bottom 20. A depending hub portion 42 is attached to and below plate 40 and a cotter pin passes through hub portion 42 and shaft 34, thereby fixedly to attach plate 40 to shaft 34. A plurality of vanes 44 are mounted on the support plate 40 and extend radially from shaft 34 extending through the center of plate 40. Each vane comprises a laterally extending portion 46 which is integrally attached to an upstanding portion 48. As may be best seen in Figure 6, the horizontally extending portions 46 are provided with extruded shanks 50 which pass through apertures in support plate 40 and are peened over as at 52 fixedly to attach each vane 44 to support plate 40. Referring to Figure 2, it will be seen that each of the upstanding portions 48 of the vanes 44 radiates from the shaft 34 to the periphery of the plate 40.

Means is provided for rotating plate 40 and its associated vanes 44 in the form of the crank 18 and a suitable train of gearing. Support for crank 18 and its associated parts is provided in the form of a pair of arms 54 and 56 which are formed integral with frame 30 and which depend perpendicularly therefrom. An axle 58 extends between arms 54—56 and is rotatably mounted in apertures therein. The right hand end of axle 58, as viewed in Figure 5, has a reduced portion 60 which extends through an aperture in support arm 56. The other end of axle 58 extends through an aperture in arm 54 and has a threaded aperture in the end thereof to receive a threaded shank 64 formed on the end of crank 18. A groove is formed in axle 58 inside of arm 54 and a split washer 66 is mounted in the groove and crimped around axle 58, thereby to hold axle 58 rotatably in position.

Mounted substantially at the midpoint of axle 58 is a driving bevel gear 68 having an integral hub portion 70. A pin 72 extends through apertures in hub 70 and axle 58, thereby fixedly to attach gear 68 to shaft 58. The bevel teeth of gear 68 are adapted to engage a driven bevel gear 74 which is rotatably mounted on a shaft 76 attached to frame 30. Also attached to shaft 76 is a gear 78 whose teeth are shaped and positioned to engage the teeth of gear 38 which is fixedly attached to the lower end of shaft 34.

It will be seen from the above description that the gear train comprising gears 38, 68, 74 and 78 is effective to rotate the vanes 44 when crank 18 is rotated. More specifically, rotation of crank 18 rotates axle 58 which in turn rotates gear 68 which is fixedly attached thereto. Rotation of gear 68 in turn rotates gear 74 and shaft 76. Gear 78 which is attached to shaft 76 in turn rotates gear 38 and shaft 34 which is attached thereto. As has been described above, the support plate 40 and the vanes 44 are rotated when shaft 38 is rotated. The gear 68 has a greater number of teeth than gear 74 and similarly gear 78 has a greater number of teeth than gear 38 whereby to give a plurality of rotations of plate 40 upon a single rotation of crank 18.

Means is provided in the form of a feed aperture 80 formed in the bottom 20 for feeding seed from the seed container 12 to the rotating vanes 44 whereby to cause the seed to be thrown radially from the seeder. Referring now to Figure 3, it will be seen that aperture 80 is positioned to deposit seed at a point substantially midway between shaft 34 and the periphery of plate 40. When seed is dropped on plate 40, it will be engaged by the upstanding portions 48 of vanes 44 and vanes 44 will tend to throw the seed outwardly by imparting a centrifugal force thereto. If the seed is uniformly fed through aperture 80 and crank 18 is uniformly rotated, the seed will be uniformly distributed from the rotating plate 40.

Means is provided for varying and regulating the amount of seed passing through aperture 80 in the form of a feed aperture closure member 82. Closure member 82 comprises a plate which is pivoted to an extension of bottom 20 by any suitable means such as a rivet 84. The end of member 82 is effective to completely close aperture 80 when in one position, as shown in Figure 2. Means is provided for normally positioning closure 82 in the closed position in the form of a spring 86, one end of which is attached to bottom 20 as at 88 (see Figure 2) and the other end of which is attached to closure 82 in a manner to be more fully explained later. Referring to Figure 2, it will be seen that a portion of closure 82 is disposed beyond the periphery of wall 22; there is formed on this portion of closure 82 a pair of upstanding flanges 90 and 92. Flange 92 has a threaded aperture formed therein which receives a set screw 94, the free end of the screw being disposed toward wall 22. It will be seen that the other end 96 of spring 86 is attached to set screw 94.

Flange 90 on closure 82 serves as a handle member for rotating closure 82 about pivot point 84 against the tension of spring 86. When screw 94 is substantially withdrawn from flange 92, the end of closure 82 which normally covers and closes aperture 80 can be rotated completely out of registration with aperture 80. If set screw 94 is moved into flange 92, i. e., the end of screw 94 is moved closer to wall 22 in the closed position of closure 82, the end of screw 94 abuts against wall 22 and limits the distance which closure 82 can be pivoted about pivot point 84. By limiting the distance which closure 82 can pivot, the end of closure 82 does not completely move away from registration of aperture 80. It will be seen that by adjusting the position of screw 94 in flange 92, any desired amount of removal of closure 82 from registration with aperture 80 can be achieved. Since the size of the effective opening of aperture controls the rate of flow of seed to the distributing mechanism 14, the amount of seed applied for unit area using the seeder can be effectively and uniformly regulated.

An important feature of the invention resides in the fact that the spring 86 tends to move closure 82 to the closed position when flange 90 is released, thereby to stop the flow of seed to the distributing mechanism 14. This feature is important when seeding around edges of the area being sown, since it is desirable when approaching the edges to abruptly and effectively stop the application of seed. Another feature of the invention resides in the fact that the cotter pin 36 extends over aperture 80 during rotation of crank 18, and thereby tends to prevent clogging of aperture 80 by breaking up any mass of seed, which may tend to form in aperture 80.

The seed container 12 and the distributing mechanism 14 are conveniently carried by means of the handle 16. A bolt 98 extends throughout the length of handle 16 through an aperture formed therein, and through an aperture formed in the bight portion 32. The end of bolt 98 which extends through bight portion 32 is threaded to receive a nut 100 which, in cooperation with bolt 98, clamps handle 16 to bight portion 32. Handle 16 is preferably square in vertical section whereby to give a more effective gripping surface. All parts of the seeder may be formed of a suitable metal and thereby give a relatively inexpensive structure. Preferably the handle 16 is formed of wood or similar material which gives greater ease in use. It is to be understood that other suitable materials or construction can be used for these parts.

A plot of ground may be effectively seeded using the present invention in the following manner. The adjustment screw 94 is set to give the desired amount of opening of aperture 80 when the end of screw 94 abuts against wall 22. The setting of screw 94 will depend upon the size of seed being used and the amount of seed desired to be applied per unit area. The seed container 12 is then filled with seed and the handle 16 is grasped in the left hand of the user. The user then grips crank 18 in his right hand and begins rotation of the crank, whereby to rotate the plate 40 and its associated vanes 44. While crank 18 is being rotated at an appropriate speed, preferably the thumb of the hand gripping handle 16 is pressed against flange 90, whereby to move closure 82 against the tension of spring 86, thereby to partially open aperture 80. The operator then moves across the area to be sown continuously rotating crank 18. When the edge of the area is reached and it is desired to interrupt the application of seed, the user merely releases flange 90, thereby allowing closure member 82 to move to the closed position. By closing aperture 80 when approaching the edges of the area being seeded, a substantial saving in seed is accomplished and, in addition, a uniform distribution of seed is obtained around the edges. The flow of seed to the distributing mechanism may be effectively accomplished without diminishing the rate at which the support plate 40 and its vanes 44 are rotated. This last feature insures uniform distribution of seed along the edges of the area being sown.

It will be seen that there has been provided a seeder which fulfills all of the above described objects and advantages. Although a preferred embodiment of the invention has been shown for purposes of illustration, it is to be understood that various changes and modifications can be made therein without departing from the scope and spirit of the invention. Accordingly the invention is to be limited only as set forth in the following claims.

The invention is hereby claimed as follows:

1. A hand seeder small enough to be supported by one hand comprising a base and an upstanding hollow cylinder mounted on said base and forming a seed container, a distributing plate rotatably mounted below said base, a crank mounted on said base, driving means interconnecting said crank and said distributing plate whereby said distributing plate is rotated when said crank is turned, said distributing plate being substantially circular and continuous whereby to shield said driving means from said base when said seeder is in operative position, said base having an aperture formed therein to provide communication between said seed container and said distributing plate, said aperture being positioned so that seed falling therefrom strikes the distributing plate at a point substantially halfway between the center of rotation and the outer periphery thereof, a handle fixedly attached to the base, a closure member pivotally mounted on the base adjacent the aperture therein, a spring normally urging the closure member to close said aperture, a flange formed on said closure member and positioned to be engaged by a finger of the hand holding said handle operable while said hand is supporting said seeder, a second flange formed on said closure member and having a threaded aperture therein, and a screw threadedly received in said flange aperture and abutting the wall of said container, the position of the screw being adjustable whereby to limit adjustably the distance which said closure member may be withdrawn from the aperture in the base.

2. A seeder as set forth in claim 1, wherein a plurality of radially extending vanes are positioned on the distributing plate, said vanes extending a short distance beyond the periphery of said distributing plate.

References Cited in the file of this patent

UNITED STATES PATENTS

| Number | Name | Date |
|---|---|---|
| 544,174 | Hyzer | Aug. 6, 1895 |
| 674,187 | Simmons | May 14, 1901 |
| 725,474 | Page et al. | Apr. 14, 1903 |
| 927,429 | Rittenhouse et al. | July 6, 1909 |
| 2,463,855 | Crawford | Mar. 8, 1949 |
| 2,489,171 | Balduf | Nov. 22, 1949 |
| 2,514,962 | McElhatton | July 11, 1950 |
| 2,561,002 | Weeks | July 17, 1951 |